(12) United States Patent
Matsushita

(10) Patent No.: US 11,209,955 B2
(45) Date of Patent: Dec. 28, 2021

(54) INFORMATION PROCESSING APPARATUS AND NON-TRANSITORY COMPUTER READABLE MEDIUM FOR MANAGING WORKFLOW

(71) Applicant: FUJIFILM Business Innovation Corp., Tokyo (JP)

(72) Inventor: Itsusei Matsushita, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/037,719

(22) Filed: Sep. 30, 2020

(65) Prior Publication Data
US 2021/0303130 A1    Sep. 30, 2021

(30) Foreign Application Priority Data
Mar. 26, 2020    (JP) .............................. JP2020-056087

(51) Int. Cl.
| | | |
|---|---|---|
| *G06F 3/0481* | (2013.01) | |
| *G06F 3/0482* | (2013.01) | |
| *G06F 3/0484* | (2013.01) | |
| *G06Q 10/06* | (2012.01) | |
| *G06Q 10/10* | (2012.01) | |
| *G06F 3/0483* | (2013.01) | |

(52) U.S. Cl.
CPC ........ *G06F 3/04817* (2013.01); *G06F 3/0482* (2013.01); *G06F 3/04847* (2013.01); *G06Q 10/0633* (2013.01); *G06Q 10/101* (2013.01); *G06Q 10/103* (2013.01); *G06F 3/0483* (2013.01)

(58) Field of Classification Search
CPC ............... G06F 3/04817; G06F 3/0482; G06F 3/04847; G06F 3/0483; G06Q 10/101; G06Q 10/0633; G06Q 10/103
See application file for complete search history.

(56) References Cited

U.S. PATENT DOCUMENTS 8,024,670 B1 *    9/2011    Rahmatian ........... G06Q 40/125
                                                                    715/838

FOREIGN PATENT DOCUMENTS

| JP | H09114895 | 5/1997 |
|---|---|---|
| JP | H09204282 | 8/1997 |

* cited by examiner

*Primary Examiner* — Andrey Belousov
(74) *Attorney, Agent, or Firm* — JCIPRNET

(57) ABSTRACT

An information processing apparatus includes a processor configured to display a structure of a combined workflow including multiple workflows as elements by displaying an array of icons corresponding to the workflows as elements.

8 Claims, 14 Drawing Sheets

INFORMATION PROCESSING APPARATUS AND NON-TRANSITORY COMPUTER READABLE MEDIUM FOR MANAGING WORKFLOW

CROSS-REFERENCE TO RELATED APPLICATIONS

This application is based on and claims priority under 35 USC 119 from Japanese Patent Application No. 2020-056087 filed Mar. 26, 2020.

BACKGROUND

(i) Technical Field

The present disclosure relates to information processing apparatuses and non-transitory computer readable media.

(ii) Related Art

Currently, there is a known system that allows for management of the progress of a business operation by using a workflow with a digitalized business procedure. With the digitalized workflow, the business procedure is visualized, so that the progress of the business operation is made visible. A workflow is defined as an array of steps, such as a request step, an approval step, an authorization step, and a storage step. A basic workflow is created for each department. With regard to the steps performed in each department, the types of business operations and the number of times the approval step is performed are limited. Thus, the contents of workflow are readily confirmable by displaying the overall workflow on an operation screen. See Japanese Unexamined Patent Application Publication No. 9-114895 for an example.

SUMMARY

Sometimes, multiple departments may be involved with a business procedure. In this case, a workflow with an exhaustive array of all the steps performed in the multiple departments is desirably created. However, since an operation screen is limited in size, displaying all the steps constituting the workflow may make it difficult to confirm the contents due to, for example, the scale being too small. Moreover, when the number of arrayed steps increases, it becomes difficult to find missing steps and rule-violating combinations.

Aspects of non-limiting embodiments of the present disclosure relate to the ease of ascertainment of an overview, as compared with creating a workflow from the beginning while arranging icons corresponding to individual steps.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to display a structure of a combined workflow including multiple workflows as elements by displaying an array of icons corresponding to the workflows as elements.

BRIEF DESCRIPTION OF THE DRAWINGS

Exemplary embodiments of the present disclosure will be described in detail based on the following figures, wherein.

DETAILED DESCRIPTION

Exemplary embodiments of the present disclosure will be described below with reference to the drawings.

Exemplary Embodiment

System Configuration

Figure 1:
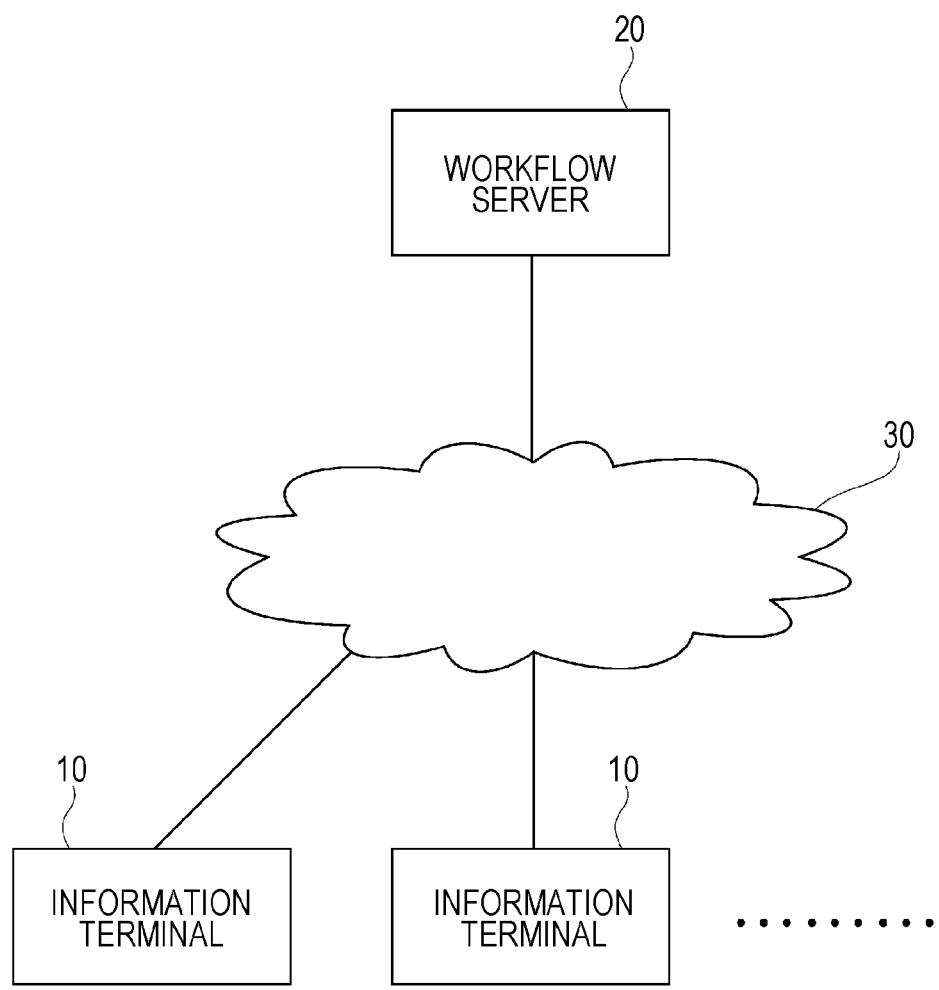
FIG. 1 illustrates a configuration example of a workflow system used in an exemplary embodiment.

FIG. 1 illustrates a configuration example of a workflow system 1 used in an exemplary embodiment.

The workflow system 1 shown in FIG. 1 has information terminals 10 operated by users authorized to use a workflow, and a workflow server 20 that manages the flow of a business operation defined as a workflow.

All of these terminals are connected to a network 30. In this exemplary embodiment, the network 30 is a local area network (LAN). Alternatively, the network 30 may entirely or partially be the Internet or a cloud network.

Each of the information terminals 10 operated by the users does not have to be a dedicated terminal for a specific user. In the case of this exemplary embodiment, a user operating an information terminal 10 is identified from an account used for a log-in process.

Each information terminal 10 is, for example, a desktop computer, a notebook computer, a tablet computer, or a smartphone.

The workflow server 20 manages the delivery of electronic documents in the workflow, as well as the progress of processes. The workflow server 20 according to this exemplary embodiment is an example of an information processing apparatus.

The workflow server 20 according to this exemplary embodiment is assumed to be constituted of a single server, but may alternatively be constituted of multiple servers operating in cooperation with each other.

In this exemplary embodiment, the term "workflow" refers to the flow of a business operation with which multiple users are involved.

The workflow in this exemplary embodiment is defined by a combination of, for example, a request step, an approval step, an authorization step, and a storage step. The contents and the combination of the steps defining the workflow vary depending on the purpose for putting the workflow into practice as well as the business operator putting the workflow into practice.

Examples of electronic documents handled in the workflow include a document created with a business application program, an electronic mail, a document electronically converted from a paper document, a photograph, an image, and so on.

Figure 2:
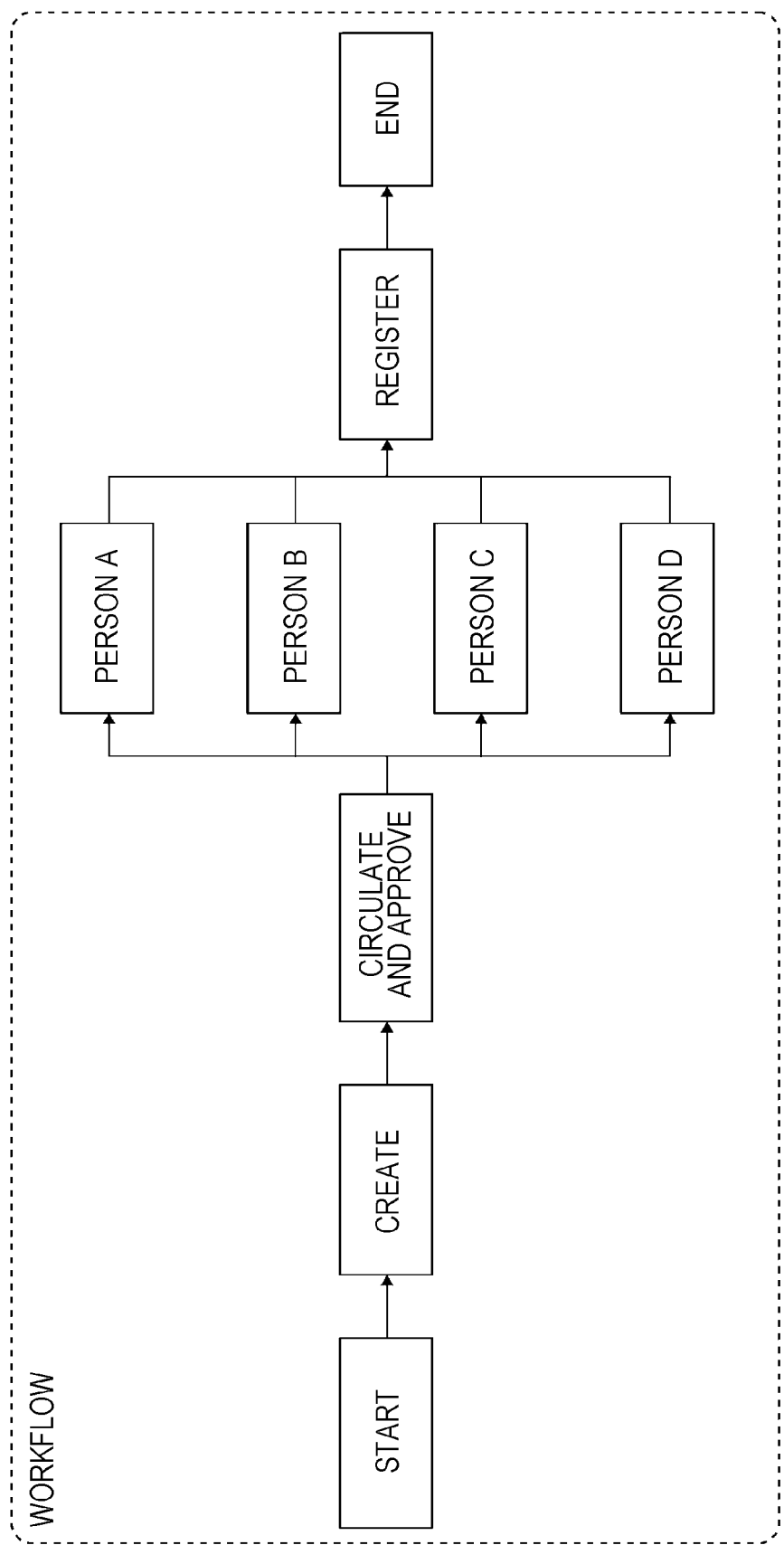
FIG. 2 illustrates a structural example of a workflow executed in a certain department.

FIG. 2 illustrates a structural example of a workflow executed in a certain department. The workflow shown in FIG. 2 includes five steps, namely, a "start" step, a "create" step, a "circulate and approve" step, a "register" step for an approved electronic document, and an "end" step. In the case of FIG. 2, the "circulate and approve" step involves a person A, a person B, a person C, and a person D.

A user designing the workflow shown in FIG. 2 repeats a process of dragging and dropping icons corresponding to the individual steps onto an operation screen and connecting the icons using lines in the sequence in which the business operation progresses. The workflow may also include a path that branches off in accordance with a condition.

Needless to say, the number of icons displayed on the operation screen increases with increasing number of steps constituting the business operation, resulting in complex graphic patterns. Therefore, when the workflow is designed in units of steps, missing steps and rule violations tend to occur, as mentioned above.

Configuration of Workflow Server

Figure 3:
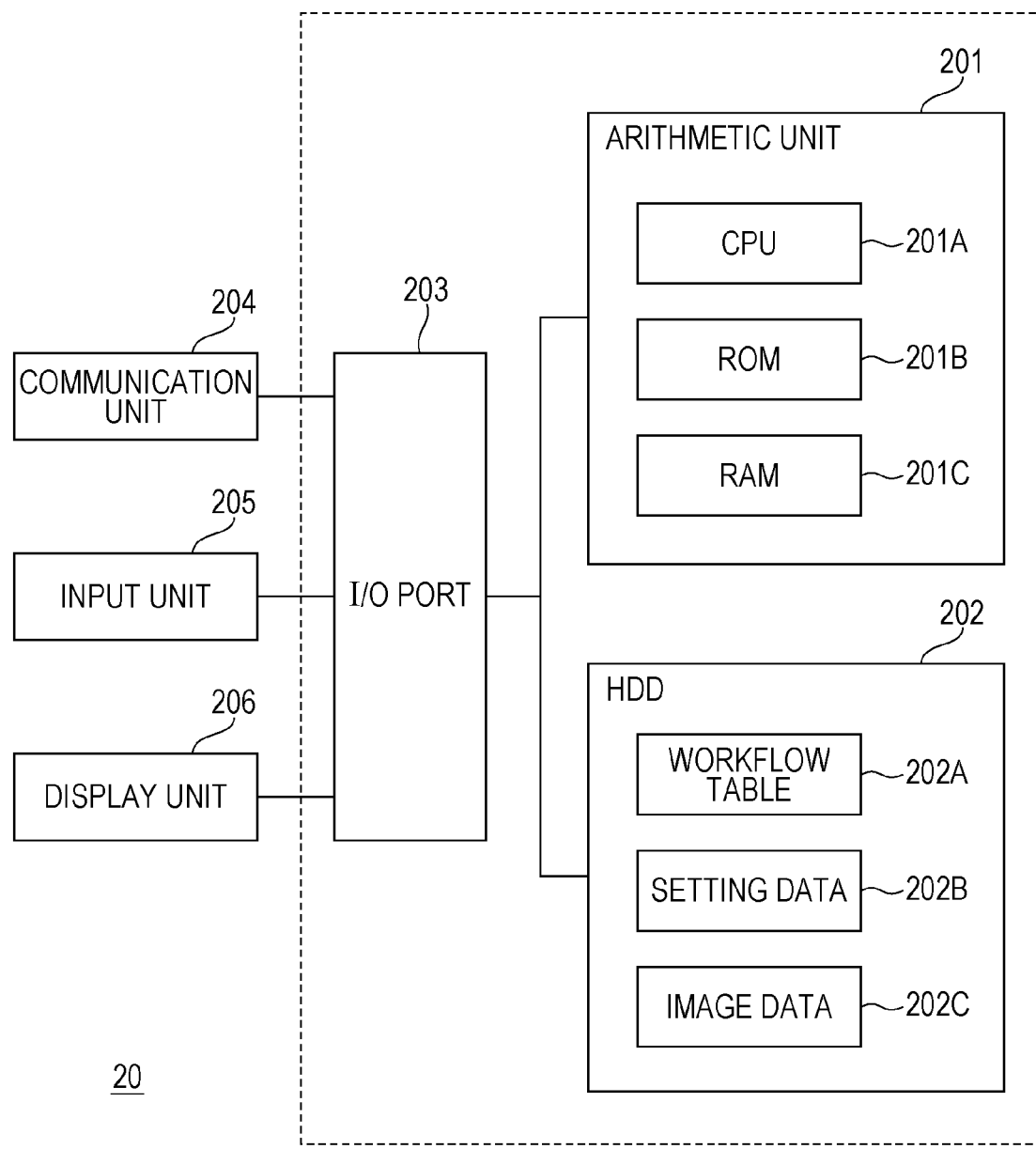
FIG. 3 illustrates a configuration example of a workflow server used in the exemplary embodiment.

FIG. 3 illustrates a configuration example of the workflow server 20 used in this exemplary embodiment.

The workflow server 20 shown in FIG. 3 has an arithmetic unit 201 that controls the operation of the entire apparatus, a hard disk drive (HDD) 202, an input/output (I/O) port 203, a communication unit 204 that realizes communication with an external apparatus, an input unit 205 used for inputting, for example, a command, and a display unit 206 used for displaying information. These units are connected by various types of signal lines.

The arithmetic unit 201 is provided with a central processing unit (CPU) 201A as an example of a processor, a read-only memory (ROM) 201B having a basic input output system (BIOS) stored therein, and a random access memory (RAM) 201C used as a work area.

The arithmetic unit 201 is a so-called computer that provides various types of functions by executing programs.

The HDD 202 is a device that drives a magnetic disk serving as a nonvolatile storage medium, and is used as a database (DB) that stores therein various types of data related to the management of the workflow. The HDD 202 also has stored therein an application program (referred to as "application" hereinafter) that assists with the creation of the workflow.

In FIG. 3, a workflow table 202A, setting data 202B, and image data 202C are shown as examples of the data stored in the HDD 202.

The workflow table 202A contains various types of data used for managing the workflow. The various types of data include the history of processes executed in the past. The history of processes include, for each process, information related to an attribute of a user performing the process, information related to an electronic document having undergone the process, and the contents of the process.

The setting data 202B is related to the settings for the workflow. The setting data 202B includes settings related to individual items constituting the workflow.

The image data 202C is data of, for example, an image used for an icon corresponding to the workflow.

Figure 4:
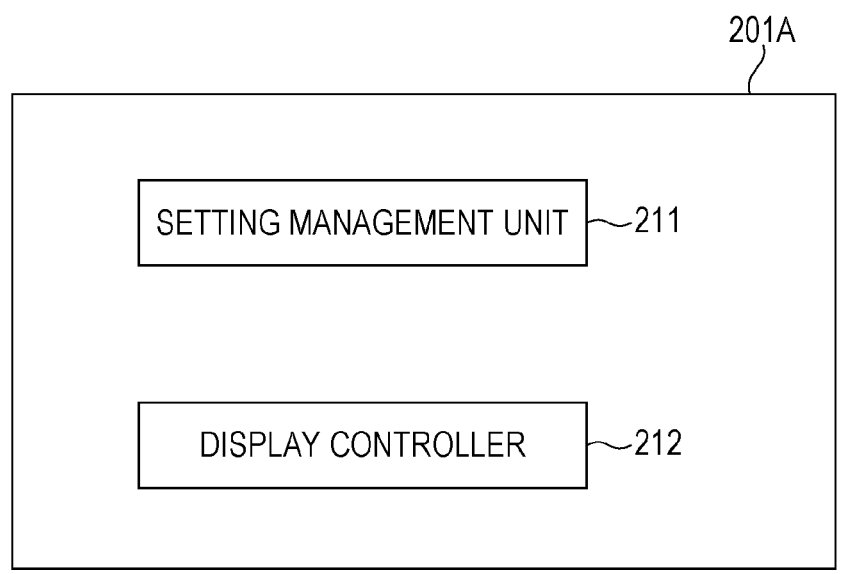
FIG. 4 illustrates an example of functions realized as a result of a central processing unit executing an application.

FIG. 4 illustrates an example of functions realized as a result of the CPU 201A executing an application. In FIG. 4, functions related to the creation of a workflow are selectively shown.

The CPU 201A functions as a setting management unit 211 that manages the settings for a workflow to be created, and also as a display controller 212 that controls the display of an operation screen related to the creation of the workflow.

The setting management unit 211 according to this exemplary embodiment executes, for example, a process for determining whether or not a user setting satisfies a rule, as well as a process for storing the setting data 202B related to the created workflow in the HDD 202.

The display controller 212 according to this exemplary embodiment operates in cooperation with the setting management unit 211 so as to execute, for example, a process for controlling the display of the operation screen in accordance with the progress of an operation related to the creation of the workflow.

Processing

An example of processing executed in the workflow server 20 will be described below with reference to FIGS. 5 to 14.

Figure 5:
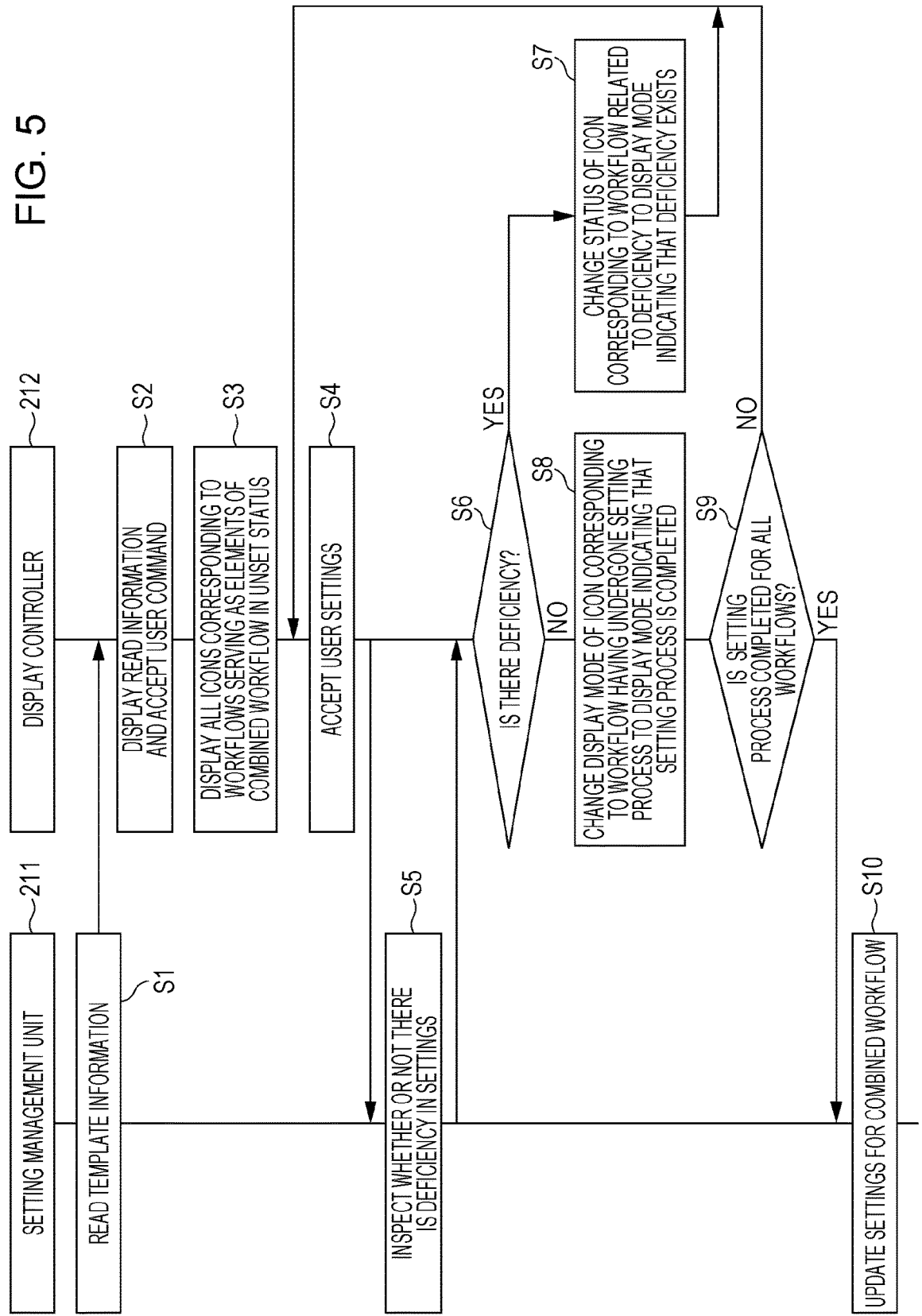
FIG. 5 illustrates an example of a workflow creating process.

FIG. 5 illustrates an example of a workflow creating process. In FIG. 5, reference sign S denotes a step.

The processing shown in FIG. 5 is executed by the setting management unit 211 and the display controller 212 operating in cooperation with each other.

In this exemplary embodiment, the input unit 205 (see FIG. 3) is used for inputting a command to the workflow server 20, and the display unit 206 (see FIG. 3) is used for displaying the operation screen. Alternatively, the information terminals 10 (see FIG. 1) connected by the network 30 (see FIG. 1) may be used for inputting a command to the workflow server 20 and for displaying the operation screen.

Figure 6:
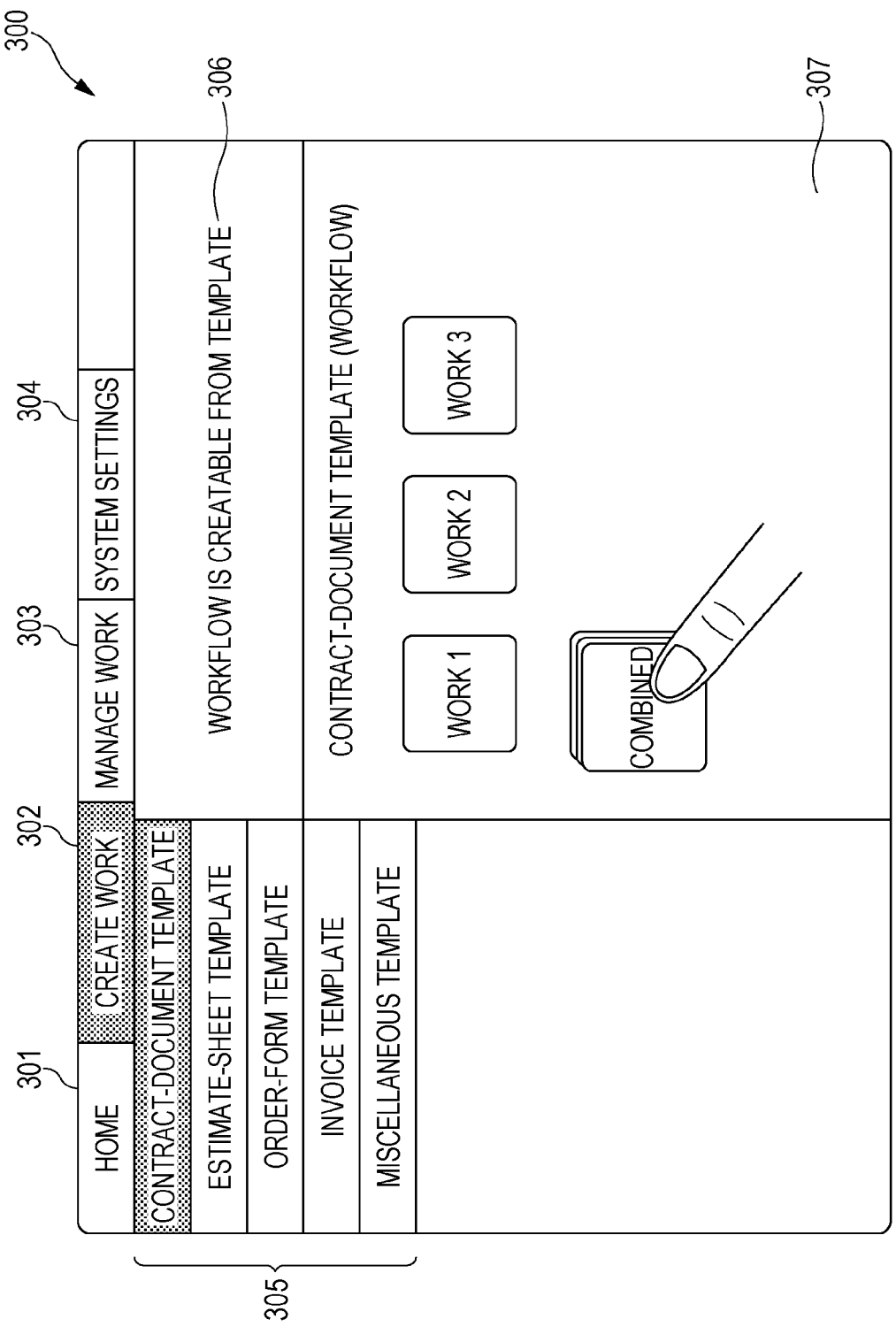
FIG. 6 illustrates an example of an operation screen used for creating a workflow.

FIG. 6 illustrates an example of an operation screen 300 used for creating a workflow.

Tabs 301 to 304 used for changing the operation screen are displayed at an upper section of the operation screen 300. The term "WORK" used in the operation screen 300 refers to a workflow.

When the tab 301 is selected, the operation screen 300 displays a home screen. The tab 301 in FIG. 6 is given a label that reads "HOME".

When the tab 302 is selected, the operation screen 300 displays a workflow-creation accepting screen. The tab 302 in FIG. 6 is given a label that reads "CREATE WORK".

When the tab 303 is selected, the operation screen 300 displays workflow-management-related information. The tab 303 in FIG. 6 is given a label that reads "MANAGE WORK".

When the tab 304 is selected, the operation screen 300 displays user-management-related information. The tab 304 in FIG. 6 is given a label that reads "SYSTEM SETTINGS".

The operation screen 300 shown in FIG. 6 is in a state where the tab 302 corresponding to the label "CREATE WORK" is selected.

A region below the tabs 301 to 304 is provided with a selection field 305 displaying a list of templates, a display field 306 displaying an explanation of a step, and a display field 307 for icons corresponding to templates.

In the case of FIG. 6, the display field 306 has the text "WORKFLOW IS CREATABLE FROM TEMPLATE" and prompts a user to select a template.

The selection field 305 displays, as selectable templates, a contract-document template, an estimate-sheet template, an order-form template, an invoice template, and a miscellaneous template. Each of these templates corresponds to a workflow. The types of templates displayed in the selection field 305 are not limited to the combination shown in FIG. 6.

The operation screen 300 shown in FIG. 6 is in a state where the contract-document template is selected.

Therefore, the icon display field 307 displays four workflow icons prepared with respect to the contract-document template.

In the case of FIG. 6, an icon given the label "WORK 1", an icon given the label "WORK 2", an icon given the label "WORK 3", and an icon given the label "COMBINED" each correspond to a workflow.

Among these icons, the icons given the labels "WORK 1", "WORK 2", and "WORK 3" each indicate an independently executable workflow. For example, these icons correspond to workflows executed at different departments.

In this exemplary embodiment, the icon given the label "COMBINED" is linked with a workflow that includes multiple workflows as elements. In the following description, a workflow that includes multiple workflows as elements will be distinguished from a workflow as an element by being referred to as "combined workflow".

A combined workflow does not differ from a workflow as an element in that the combined workflow is defined as a combination of icons corresponding to individual steps. However, a combined workflow in this exemplary embodiment also has a structure as a combination of existing workflows. Accordingly, users may readily ascertain the overview, thereby facilitating the process for checking missing steps and rule violations.

As an alternative to the case in FIG. 6 where only one template icon corresponding to a combined workflow is displayed, multiple icons may be displayed. For example, a template icon including the workflow corresponding to "WORK 1" and the workflow corresponding to "WORK 2" as elements and a template icon including the workflow corresponding to "WORK 1", the workflow corresponding to "WORK 2", and the workflow corresponding to "WORK 3" as elements may be prepared.

The workflows serving as elements of the combined workflow are not limited to the workflows displayed on the operation screen 300.

When any of the icons in the icon display field 307 is tapped on, the setting management unit 211 reads information about a template corresponding to the tapped icon in step S1. Since the icon for the combined workflow is tapped on in FIG. 6, the setting management unit 211 reads information about a combined-workflow template. Subsequently, the setting management unit 211 provides the read information to the display controller 212.

In step S2, the display controller 212 displays the read information and accepts a user command.

Figure 7:
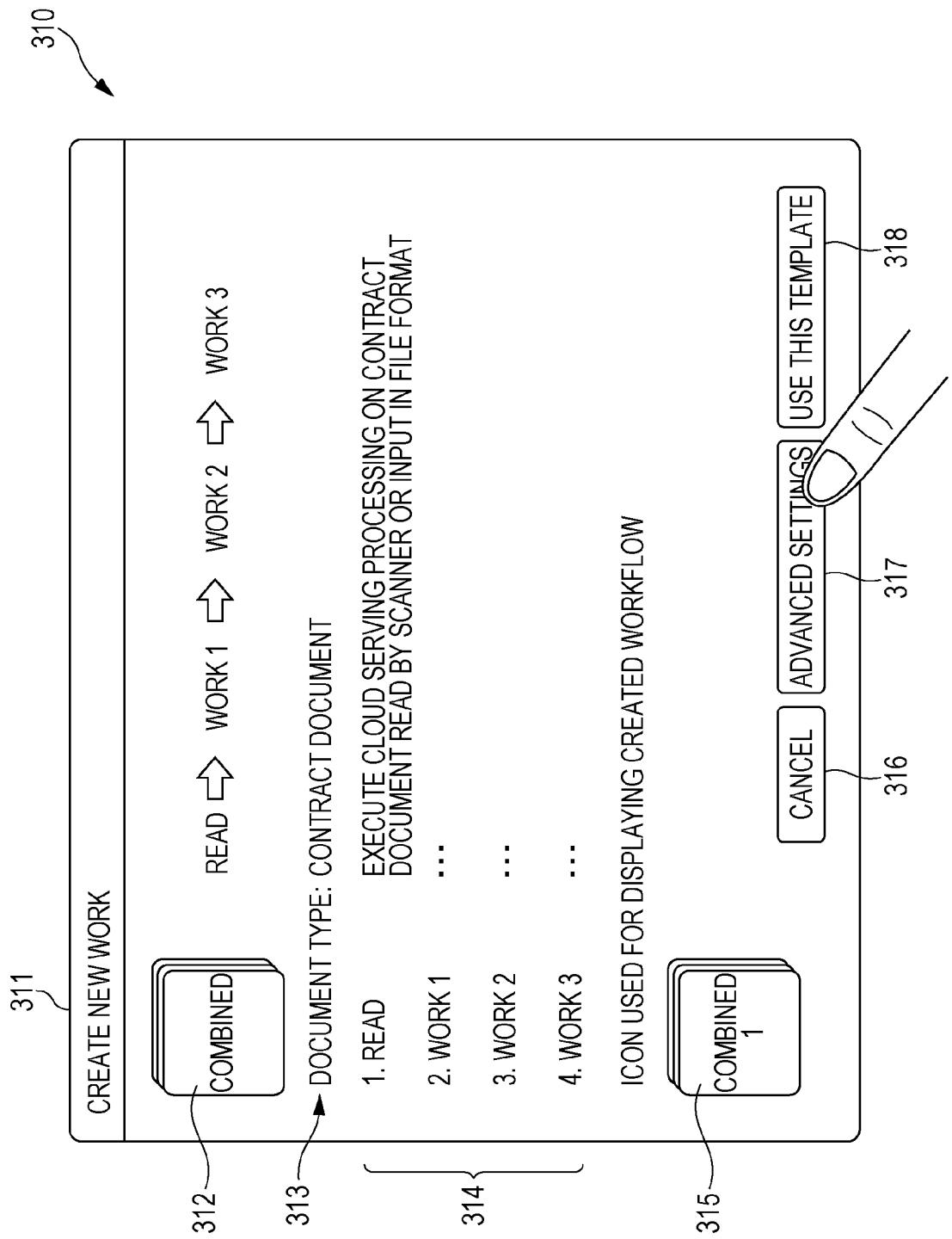
FIG. 7 illustrates an example of an operation screen displaying template information.

FIG. 7 illustrates an example of an operation screen 310 displaying template information.

The operation screen 310 is given a title 311 that reads "CREATE NEW WORK".

Structure information 312 of a template for steps is indicated using text below the title 311. In the case of FIG. 7, the icon tapped on by the user and the content "READ→WORK 1→WORK 2→WORK 3" are shown. The arrows indicate the sequence of the progress of the workflow.

The text "READ" indicates that an electronic document to be processed in the workflow is to be read. As shown in FIG. 7, the reading of an electronic document involves not only reading of a paper document by using a scanner, but also inputting of a data file.

The template shown in FIG. 7 includes three workflows corresponding to "WORK 1", "WORK 2", and "WORK 3".

A type 313 of a document (referred to as "document type" hereinafter) with which the combined workflow to be created is related is displayed below the structure information 312. In the case of FIG. 7, the text "DOCUMENT TYPE: CONTRACT DOCUMENT" is displayed.

Descriptive text 314 related to the contents of the individual elements constituting the combined workflow is displayed below the document type 313. In FIG. 7, descriptive text related to "READ" is displayed.

An icon 315 used for displaying the created workflow is displayed below the descriptive text 314. In the case of FIG. 7, a label "COMBINED 1" different from the template is provided.

Furthermore, the operation screen 310 displays a button 316 for cancelling the creation of a new workflow, a button 317 for opening an operation screen used for advanced settings, and a button 318 for creating a combined workflow having the same contents as the template.

In the case of FIG. 7, the advanced-settings button 317 is tapped on by the user. If the button 318 is tapped on, a new combined workflow obtained by replicating the template is created.

When the button 317 given the label "ADVANCED SETTINGS" is tapped on, the display controller 212 changes the display to an operation screen for inputting advanced settings.

Figure 8:
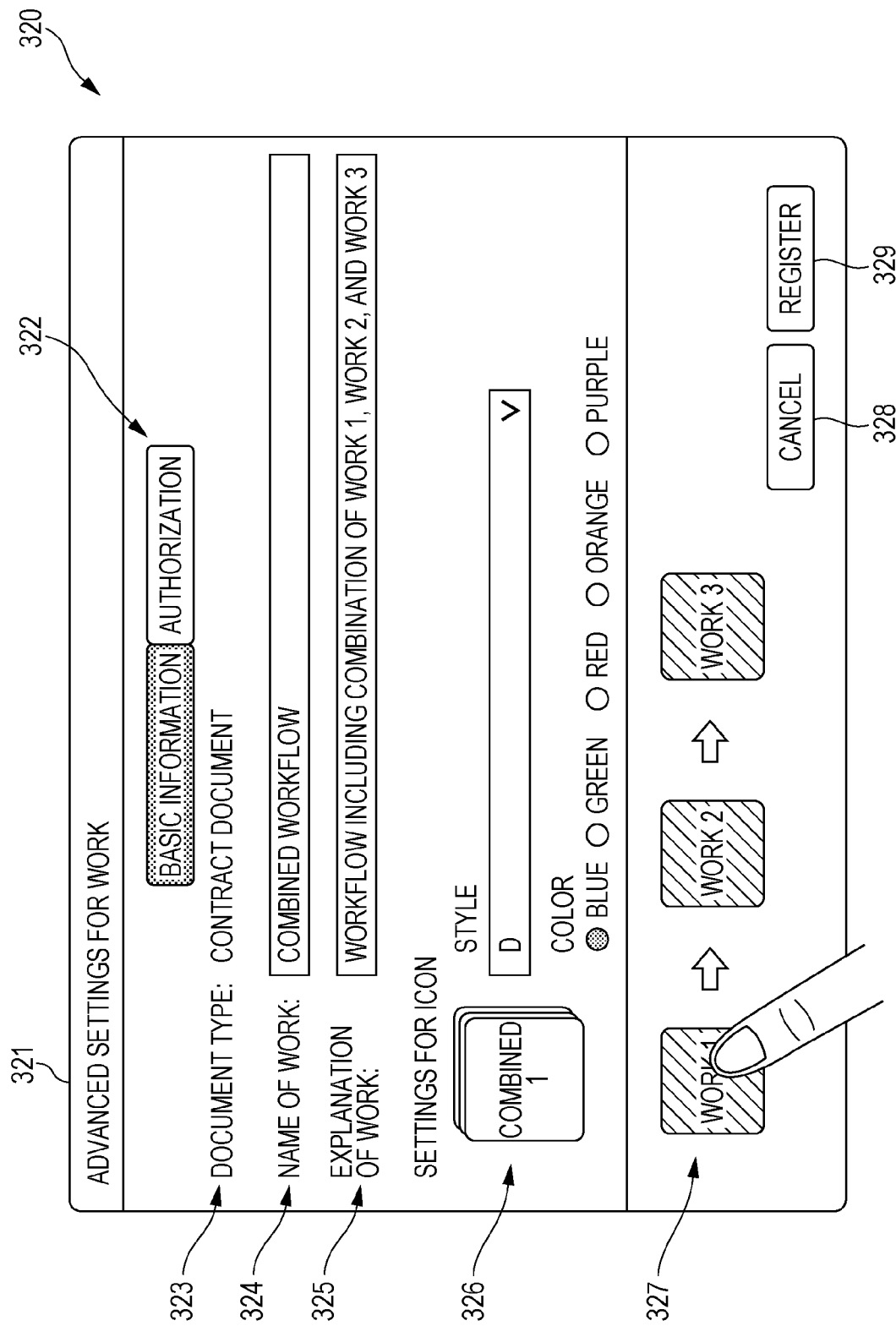
FIG. 8 illustrates an example of an operation screen used for advanced settings for a combined workflow to be newly created.

FIG. 8 illustrates an example of an operation screen 320 used for advanced settings for the combined workflow to be newly created.

The operation screen 320 is given a title 321 that reads "ADVANCED SETTINGS FOR WORK".

A button 322 used for selecting the contents to be displayed on the operation screen 320 is displayed below the title 321. In this exemplary embodiment, the advanced settings screen is divided into two screens, namely, a "BASIC INFORMATION" screen and an "AUTHORIZATION" screen. In FIG. 8, the "BASIC INFORMATION" screen of the two screens is displayed.

A document type 323 with which the combined workflow to be created is related is displayed below the button 322. In the case of FIG. 8, the text "DOCUMENT TYPE: CONTRACT DOCUMENT" is shown.

An input field 324 that accepts a name of work input by the user and an input field 325 that accepts an input of an explanation of work are displayed below the document type 323.

In the case of FIG. 8, the text "COMBINED WORKFLOW" is input as the name of work, and the text "WORKFLOW OF COMBINATION OF WORK 1, WORK 2, AND WORK 3" is input as the explanation of work.

A region 326 used for the settings of an icon used for displaying the created combined workflow is displayed below the input field 325. In the case of FIG. 8, the style and color of the icon are selectable. In FIG. 8, "D" is selected as the style, and "BLUE" is selected as the color of the icon.

A display field 327 for the structure of the combined workflow is displayed below the region 326 used for the settings of an icon. In the case of FIG. 8, the display field 327 indicates the structure of the combined workflow by using an array of icons for workflows included as elements. The arrows in FIG. 8 indicate the execution sequence. Therefore, in the combined workflow, the workflow corresponding to "WORK 1" is executed first, the workflow corresponding to "WORK 2" is executed next, and the workflow corresponding to "WORK 3" is subsequently executed. Because the structure of the combined workflow is displayed using icons in units of workflows, an overview of the combined workflow may be readily ascertained.

The operation screen 320 shown in FIG. 8 shows a state before an advanced setting process is started. Therefore, in step S3, the display controller 212 (see FIG. 5) displays all the icons for the workflows serving as the elements of the combined workflow in an unset status.

Thus, in the operation screen 320, the icon for "WORK 1", the icon for "WORK 2", and the icon for "WORK 3" indicate that the advanced setting process is not completed yet, that is, the icons are in an unset status. As an alternative to FIG. 8 in which the icons are expressed using the same mode, the icons may be expressed using different modes so long as it is ascertainable that the advanced setting process for the workflows corresponding to the individual icons has not been completed yet.

In the case of FIG. 8, the icon given the label "WORK 1" is tapped on as a target for advanced settings. Subsequently, the operation screen 320 changes to a screen that accepts advanced settings for the workflow corresponding to "WORK 1". Although it is possible to tap on the icon given the label "WORK 2" or "WORK 3" first, there is a possibility that the setting process for the workflow corresponding to "WORK 2" or "WORK 3" may have to be performed again depending on the contents of the settings for the workflow corresponding to "WORK 1".

The operation screen 320 also includes a button 328 for cancelling the set contents and a button 329 for registering the set contents. With regard to the button 329, an operation performed thereon is determined as being ineffective unless the advanced setting process related to all workflows as elements has been completed.

Figure 9:
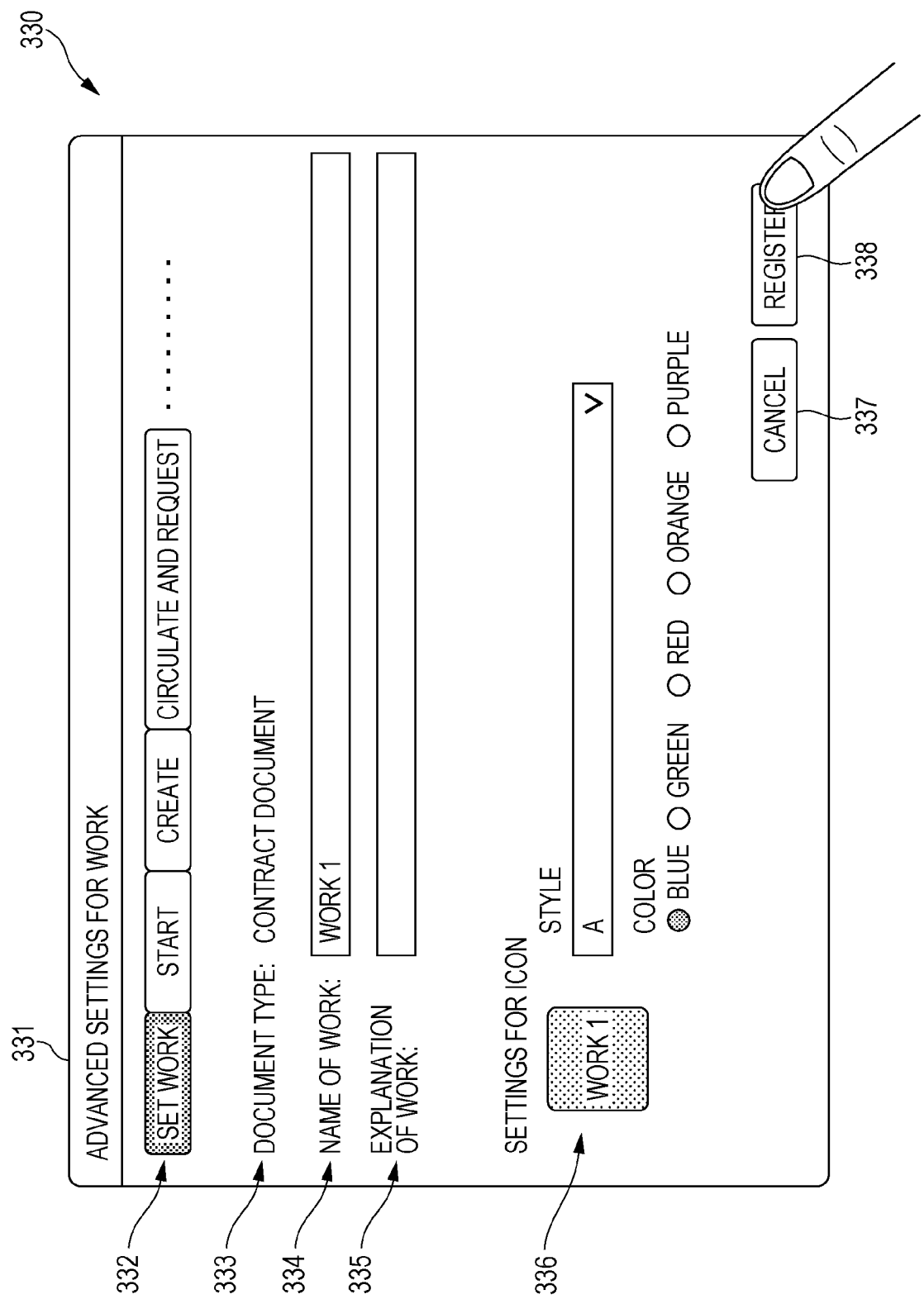
FIG. 9 illustrates an example of an operation screen used for advanced settings for workflows as elements.

FIG. 9 illustrates an example of an operation screen 330 used for advanced settings for workflows as elements. By performing a setting process using the operation screen 330, each workflow as an element is customized for a combined workflow.

The operation screen 330 is also given a title 331 that reads "ADVANCED SETTINGS FOR WORK".

Structure information 332 of the workflow corresponding to "WORK 1" as a target to undergo the setting process on the operation screen 330 is indicated by using buttons below the title 331. In the case of FIG. 9, the structure information 332 includes a "SET WORK" button, a "START" button, a "CREATE" button, and a "CIRCULATE AND REQUEST" button.

When any of the buttons is tapped on, a screen that accepts the settings with respect to the corresponding step is displayed. Because the operation screen 330 shown in FIG. 9 displays the settings not for individual steps but for a workflow as "WORK 1", the "SET WORK" button is selected.

In this exemplary embodiment, steps constituting a workflow are displayed as a list, so that a missing step may less likely to occur, unlike a case where a combined workflow is designed by linking steps as minimum units from the beginning.

In the case of FIG. 9, a document type 333 with which the workflow to be set is related is displayed below the structure information 332. In the case of FIG. 9, the text "DOCUMENT TYPE: CONTRACT DOCUMENT" is displayed.

An input field 334 that accepts a name of work input by the user and an input field 335 that accepts an input of an explanation of work are displayed below the document type 333.

In the case of FIG. 9, "WORK 1" is input as the name of work, but the explanation of work is blank.

A region 336 used for the settings for an icon indicating "WORK 1" is displayed below the input field 335. In the case of FIG. 9, the style and color of the icon are selectable. In FIG. 9, "A" is selected as the style, and "BLUE" is selected as the color of the icon. The style in this case is used for distinguishing "WORK 1" customized for a combined workflow from others.

The operation screen 330 also includes a button 337 for cancelling the set contents and a button 338 for registering the set contents. By operating the button 338, the set contents input to the operation screen 330 are confirmed.

In step S4, the display controller 212 (see FIG. 5) accepts the user settings through an operation performed on the button 338. Subsequently, the display controller 212 changes the display to the operation screen 320 (see FIG. 8) used for advanced settings for the combined workflow.

When changing the display, the display controller 212 outputs the accepted set contents to the setting management unit 211.

In step S5, the setting management unit 211 having received the set contents inspects whether or not there is a deficiency in the settings. In other words, the setting management unit 211 inspects whether or not the workflow having undergone a change in the settings by the user operates properly.

The inspection in this case includes not only an inspection performed in a condition where only "WORK 1" as a target for the advanced setting process operates, but also an inspection performed in a condition where "WORK 1" operates in cooperation with another element. For example, even with the set contents determined as being normal in view of "WORK 1" operating alone, a deficiency may be detected in the settings in view of "WORK 1" and "WORK 2" operating in cooperation with each other.

The inspection result is provided to the display controller 212 from the setting management unit 211. The display controller 212 receiving the inspection result determines whether or not there is a deficiency in step S6, and reflects the determination result on the display of the operation screen 320.

Figure 10:
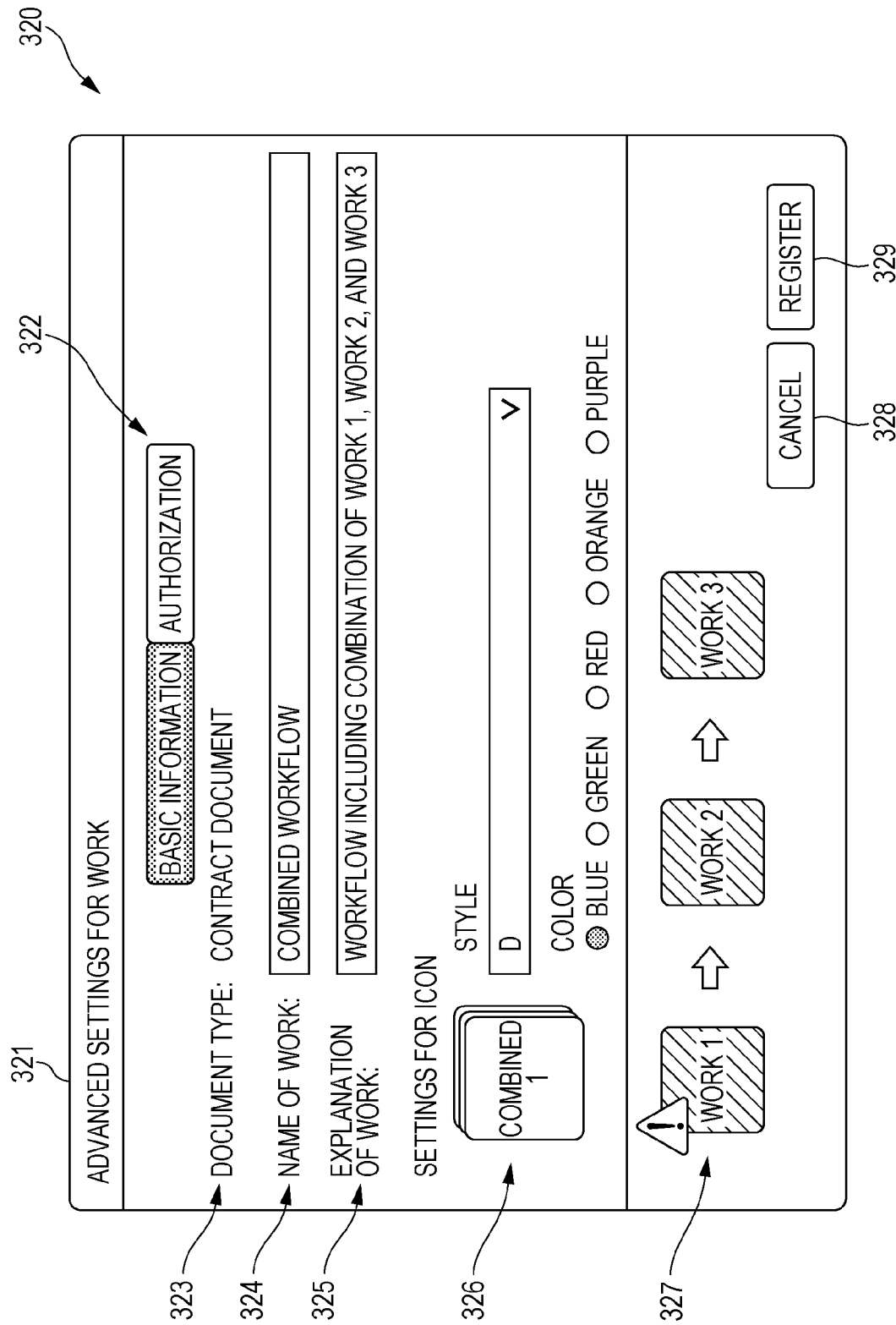
FIG. 10 illustrates an example of an operation screen in a case where a single deficiency is detected in a first workflow having undergone a change in the settings.

FIG. 10 illustrates an example of the operation screen 320 in a case where a single deficiency is detected in "WORK 1" having undergone a change in the settings. In FIG. 10, sections corresponding to those in FIG. 8 are given corresponding reference signs.

In this exemplary embodiment, it is regarded that the setting process is not completed while a deficiency is being detected. Therefore, in FIG. 10, the icon corresponding to "WORK 1" is the same as that on the operation screen 320 shown in FIG. 8, except for an error mark. By displaying the error mark, it is clear that there is a certain deficiency in the advanced settings related to "WORK 1".

In this case, the user taps on the icon for "WORK 1" again, thereby transitioning to the operation screen 330 (see FIG. 9). For example, the operation screen 330 displays the content of the deficiency, the item where the deficiency is detected, and an advice for resolving the deficiency.

Figure 11:
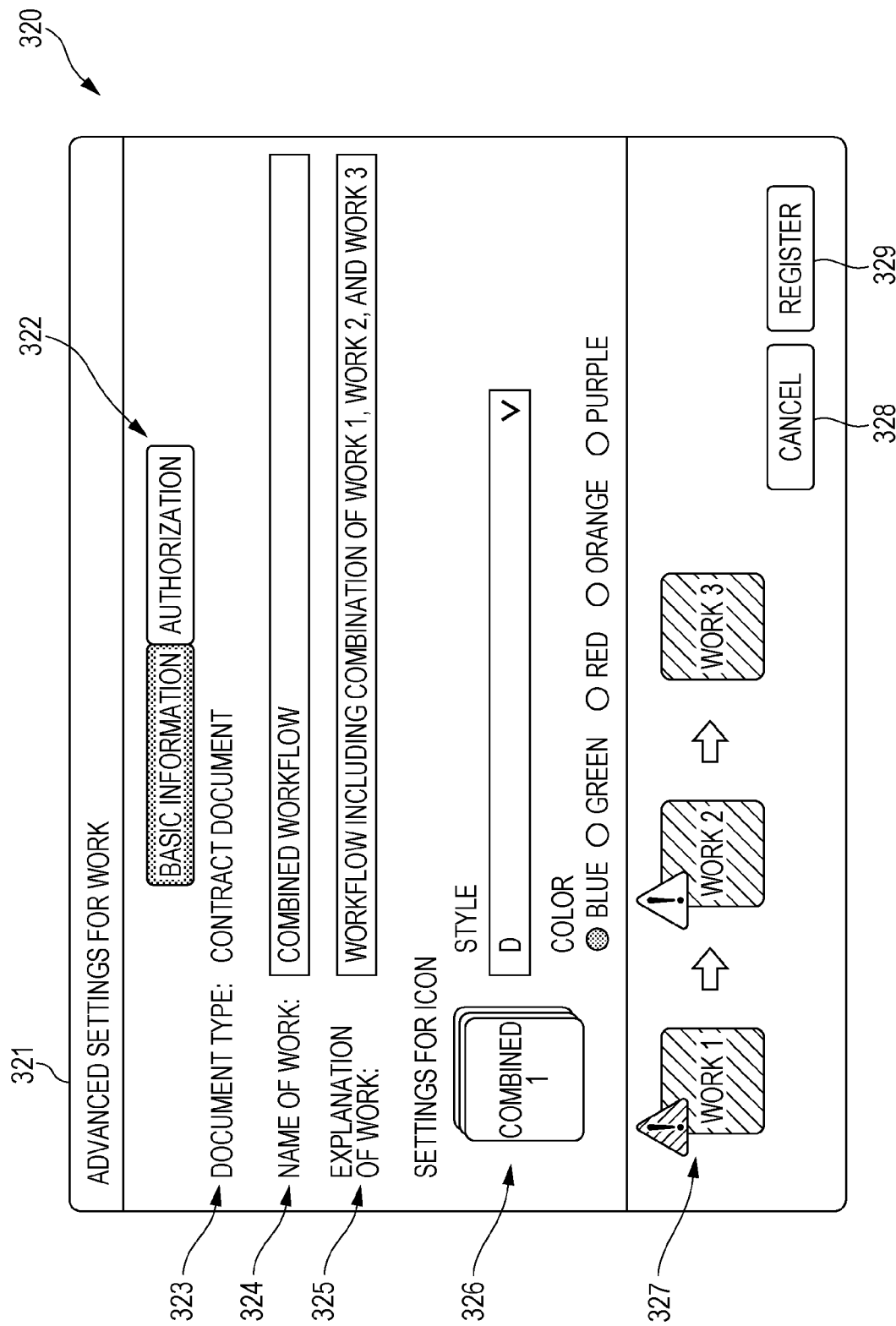
FIG. 11 illustrates an example of an operation screen in a case where there is a deficiency in the settings for the first workflow due to a relationship with a subsequent workflow.

FIG. 11 illustrates an example of the operation screen 320 in a case where there is a deficiency in the settings for "WORK 1" due to a relationship with subsequent work. In FIG. 11, sections corresponding to those in FIG. 8 are given corresponding reference signs.

In the case of the operation screen 320 shown in FIG. 11, an error mark is displayed not only on set "WORK 1" but also on unset "WORK 2". In the case of FIG. 11, the error mark on "WORK 1" requested for a change in the settings is expressed in a mode different from that of the error mark on "WORK 2" that is affected by the settings for "WORK 1".

Alternatively, the same error mark may be used instead of preparing multiple error marks as shown in FIG. 11.

FIG. 10 or 11 is displayed when a positive result is obtained in step S6. Specifically, in step S7, the display controller 212 (see FIG. 5) changes the status of the icon corresponding to the workflow related to the deficiency to a display mode indicating that the deficiency exists.

After executing step S7, the display controller 212 returns to step S4.

In contrast, if a negative result is obtained in step S6, the display controller 212 proceeds to step S8 to change the display mode of the icon corresponding to the workflow having undergone the setting process to a display mode indicating that the setting process is completed.

Figure 12:
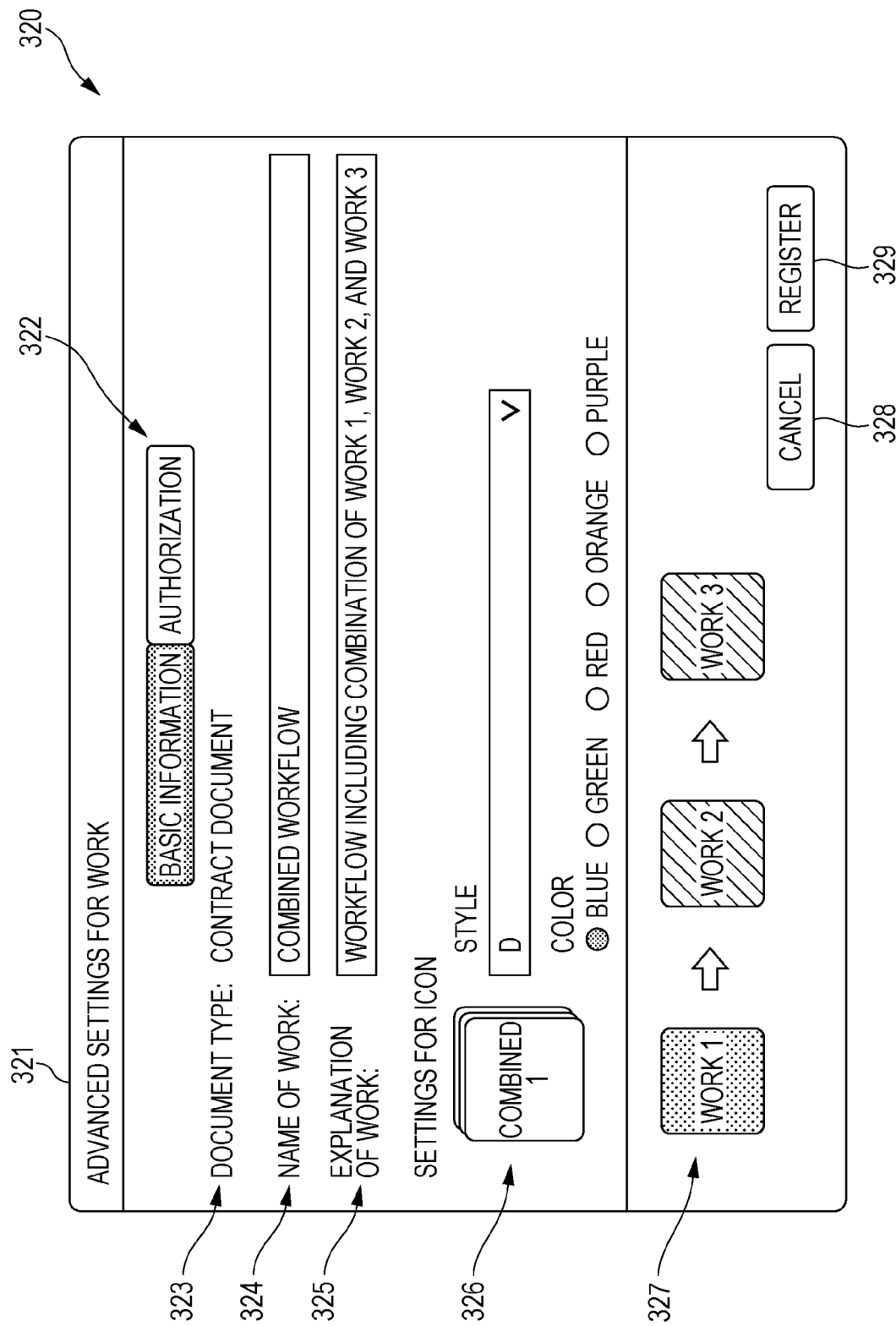
FIG. 12 illustrates an example of an operation screen in a case where a deficiency is not detected in the first workflow having undergone a change in the settings.

FIG. 12 illustrates an example of the operation screen 320 in a case where a deficiency is not detected in "WORK 1" having undergone a change in the settings. In FIG. 12, sections corresponding to those in FIG. 8 are given corresponding reference signs.

In the case of the operation screen 320 shown in FIG. 12, since the advanced setting process for "WORK 1" has been completed, the display mode of the icon has been changed to that of the icon set on the operation screen 330 (see FIG. 9). The statuses of the icons corresponding to "WORK 2" and "WORK 3" remain the same as in the operation screen 320 shown in FIG. 8.

Thus, the user viewing the operation screen 320 shown in FIG. 12 may readily confirm that the setting process for "WORK 1" has been completed but the setting process for the two remaining workflows has not been completed yet.

After step S8, the display controller 212 determines in step S9 whether or not the setting process has been completed for all the workflows.

While a negative result is being obtained in step S9, the display controller 212 returns to step S4 to accept the setting process for the remaining workflows.

If a positive result is obtained in step S9, the display controller 212 notifies the setting management unit 211 that the setting process has been completed for all the workflows constituting the combined workflow.

Figure 13:
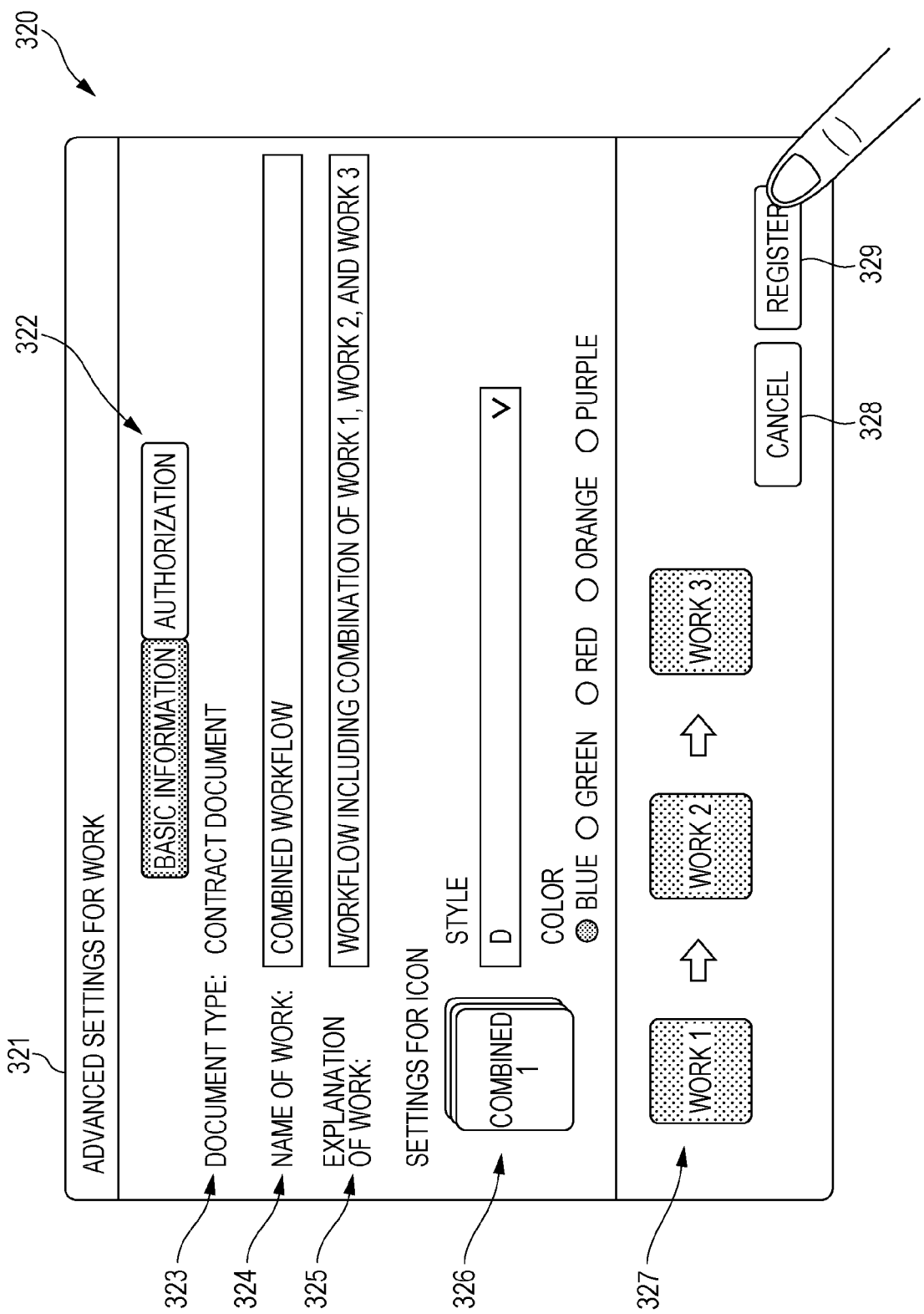
FIG. 13 illustrates an example of an operation screen in a case where a setting process has been completed for all workflows constituting a combined workflow.

FIG. 13 illustrates an example of the operation screen 320 in a case where the setting process has been completed for all the workflows constituting the combined workflow. In FIG. 13, sections corresponding to those in FIG. 8 are given corresponding reference signs.

In the case of the operation screen 320 shown in FIG. 13, the icons corresponding to the three workflows constituting the combined workflow, that is, "WORK 1", "WORK 2", and "WORK 3", are all different from the icons prior to the start of the advanced setting process.

Therefore, by displaying the operation screen 320 shown in FIG. 13, it is visually confirmed that the advanced setting process has been completed for all the workflows used as elements of the combined workflow.

As mentioned above, when the setting process has been completed for all the workflows, the button 329 becomes operable. When the user operates the button 329, the display controller 212 notifies the setting management unit 211 of the contents of the accepted settings.

In step S10, the setting management unit 211 updates the settings for the combined workflow based on the reported contents of the accepted settings.

Figure 14:
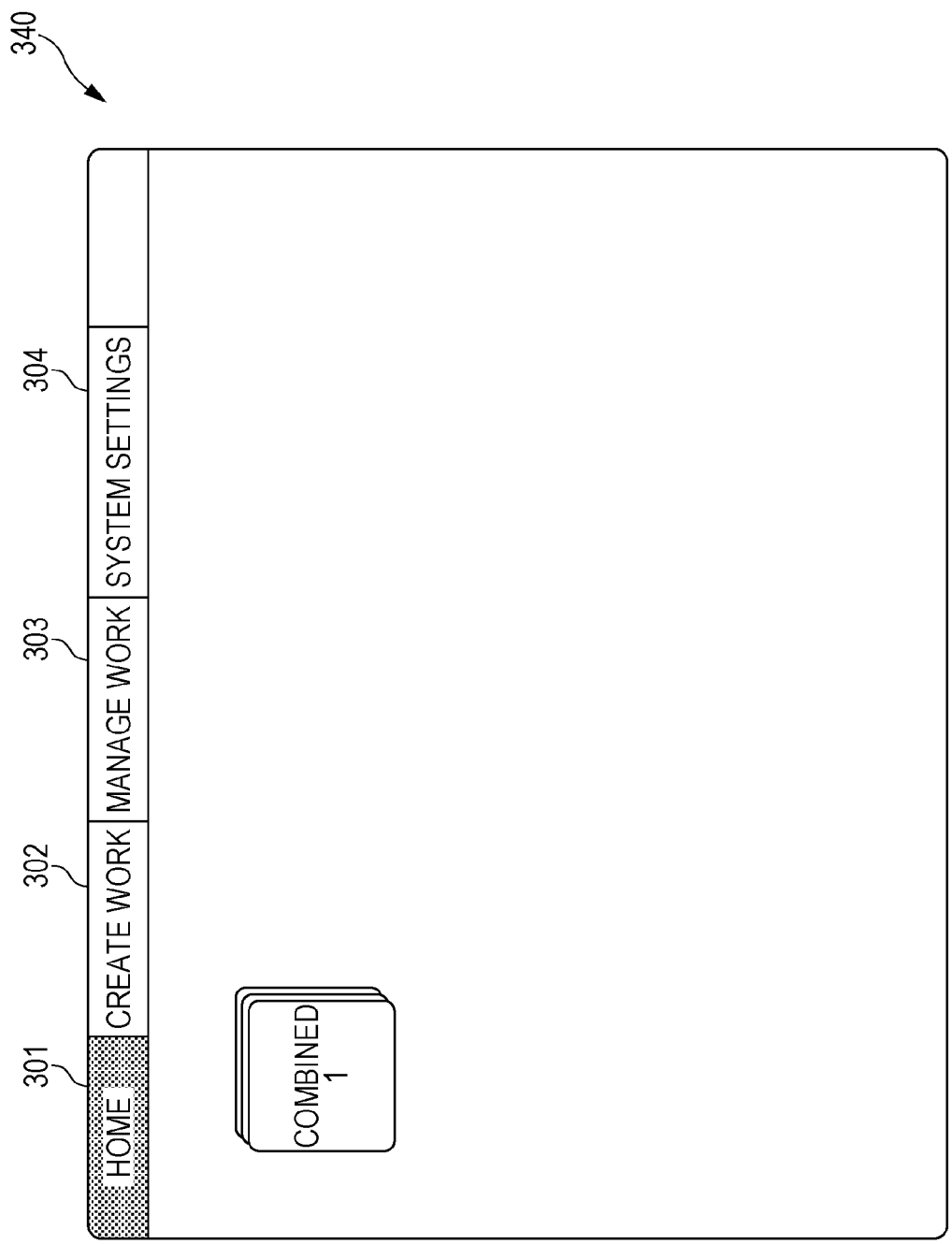
FIG. 14 illustrates an example of a home screen displayed after a combined workflow is created.

FIG. 14 illustrates an example of a home screen 340 displayed after the combined workflow is created. In FIG. 14, sections corresponding to those in FIG. 6 are given corresponding reference signs.

The home screen 340 displays an icon for the combined workflow created using the template. The style and color set on the operation screen 320 shown in FIG. 8 are reflected on the icon. The icon is given a label different from that in the template.

Other Exemplary Embodiments

Although the exemplary embodiment of the present disclosure has been described above, the technical scope of the present disclosure is not limited to the above exemplary embodiment. It is obvious from the claims that exemplary embodiments obtained by adding various modifications or alterations to the above exemplary embodiment are included in the technical scope of the present disclosure.

For example, as an alternative to the above exemplary embodiment in which a template is used for creating a combined workflow, a combined workflow may be created by arranging freely-chosen icons corresponding to workflows in the execution sequence on, for example, the operation screen 300. Even in this case, the setting process for the individual workflows constituting the combined workflow may be performed by using any of the operation screens shown in FIGS. 7 to 13.

As an alternative to the above exemplary embodiment in which the processing for creating a combined workflow is executed in the workflow server 20 (see FIG. 1), a terminal that executes the aforementioned processing may be prepared independently of the workflow server 20, or the aforementioned processing may be executed in any of the information terminals 10 (see FIG. 1).

In the exemplary embodiments above, the term "processor" refers to hardware in a broad sense. Examples of the processor include general processors (e.g., CPU: Central Processing Unit) and dedicated processors (e.g., GPU: Graphics Processing Unit, ASIC: Application Integrated Circuit, FPGA: Field Programmable Gate Array, and programmable logic device).

In the exemplary embodiments above, the term "processor" is broad enough to encompass one processor or plural processors in collaboration which are located physically apart from each other but may work cooperatively. The order of operations of the processor is not limited to one described in the exemplary embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The exemplary embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising: a processor configured to display element an array of icons element each representing a different element workflow of a plurality of element workflows which are interrelated and constitutes a structure of a combined workflow; receive a setting process to perform a setting of a first element workflow; detect a first deficiency in the setting of first element workflow, the first deficiency occurring as an abnormal operation of the first element workflow having undergone the setting; detect a second deficiency in the setting of the first element workflow, the second deficiency occurring as a result of a relationship between the first element workflow and subsequent second element workflow, that operates in cooperation with the first element workflow, wherein the first element workflow and the subsequent second element workflow are among the plurality of element workflows; in response to detecting the first deficiency, adding a first mark on a first icon corresponding to the first element workflow; in response to detecting the second deficiency, adding a second mark on the first icon corresponding to the first element workflow, and adding a third mark on a second icon corresponding to the second element workflow, wherein the second mark is different from the first mark.

2. The information processing apparatus according to claim 1, wherein the processor is configured to change the display of the icons in accordance with progress of an operation with respect to the combined workflow.

3. The information processing apparatus according to claim 2, wherein the processor is configured to change the display of the icons before and after a setting process performed by a user.

4. The information processing apparatus according to claim 1, wherein the processor is configured to differentiate the display of the first element workflow undergoing the setting process from the display of the second element workflow with which the second deficiency is related.

5. The information processing apparatus according to claim 1, wherein the processor is configured to display an icon corresponding to the combined workflow including the plurality of element workflows on an operation screen.

6. The information processing apparatus according to claim 5, wherein the combined workflow is a template prepared in advance.

7. A non-transitory computer readable medium storing a program causing a computer to execute a process, the process comprising: displaying an array of icons each representing a different element workflow of a plurality of element workflows which are interrelated and constitutes a structure of a combined workflow; receiving a setting process to perform a setting of a first element workflow; detecting a first deficiency in the setting of first element workflow, the first deficiency occurring as an abnormal operation of the first element workflow having undergone the setting; detecting a second deficiency in the setting of the first element workflow, the second deficiency occurring as a result of a relationship between the first element workflow and subsequent second element workflow, that operates in cooperation with the first element workflow, wherein the first element workflow and the subsequent second element workflow are among the plurality of element workflows; in response to detecting the first deficiency, adding a first mark on a first icon corresponding to the first element workflow; and in response to detecting the second deficiency, adding a second mark on the first icon corresponding to the first element workflow, and adding a third mark on a second icon corresponding to the second element workflow, wherein the second mark is different from the first mark.

8. An information processing apparatus comprising: means for displaying an array of icons each representing a different element workflow of a plurality of element workflows which are interrelated and constitutes a structure of a combined workflow: means for receiving a setting process to perform a setting of a first element workflow; means for detecting a first deficiency in the setting of first element workflow, the first deficiency occurring as an abnormal operation of the first element workflow having undergone the setting; means for detecting a second deficiency in the setting of the first element workflow, the second deficiency occurring as a result of a relationship between the first element workflow and subsequent second element workflow, that operates in cooperation with the first element workflow, wherein the first element workflow and the subsequent second element workflow are among the plurality of element workflows; means for in response to detecting the first deficiency, adding a first mark on a first icon corresponding to the first element workflow; and means for in response to detecting the second deficiency, adding a second mark on the first icon corresponding to the first element workflow, and adding a third mark on a second icon corresponding to the second element workflow, wherein the second mark is different from the first mark.

* * * * *